MAGNETIC MEMORY APPARATUS

Filed Aug. 27, 1965 6 Sheets-Sheet 1

INVENTORS.
RICHARD H. JONES
ERIC E. BITTMANN
BY
Samuel Kane
ATTORNEY

INVENTORS.
RICHARD H. JONES
ERIC E. BITTMANN
BY Samuel Kane
ATTORNEY

MAGNETIC MEMORY APPARATUS

INVENTORS.
RICHARD H. JONES
ERIC E. BITTMANN

BY Samuel Kane
ATTORNEY

INVENTORS.
RICHARD H. JONES
ERIC E. BITTMANN

BY Samuel Kane
ATTORNEY

INVENTORS.
RICHARD H. JONES
ERIC E. BITTMANN
BY Samuel Kane
ATTORNEY

3,496,555
MAGNETIC MEMORY APPARATUS

Richard H. Jones, Wayne, and Eric E. Bittmann, Downingtown, Pa., assignors to Burroughs Corporation, Detroit, Mich., a corporation of Michigan Filed Aug. 27, 1965, Ser. No. 483,096
Int. Cl. G11b 5/00
U.S. Cl. 340—174 14 Claims

ABSTRACT OF THE DISCLOSURE

Thin film magnetic memory apparatus in which the thin films are contained in a plurality of assemblies arranged in spaced stacks of assemblies, and in which the thin films are arranged in two layers in each assembly with the several conductors inductively coupled to and extending between pairs of thin films formed by the two layers. The use of paired films provides improved magnetic performance and increased signal output. The films are supported on substrates and the conductors are flat and flexible and supported on spaced flexible tapes of electrical insulating material. Connections are made by means of circuit boards between the stacks of assemblies and at their end regions.

This invention relates generally to magnetic memory devices, and more particularly to magnetic memory apparatus for storing information in data processing and computing systems.

Prior art memory systems have been subject to certain limitations, particularly in the case where the magnetic storage media have been in the form of thin film elements of bistable state magnetic storage material. For example, the magnetic thin films are open loop devices and therefore their flux lines return through an air path. Such films have therefore been susceptible to stray magnetic fields. Thin films have also been limited in their ability to store information because of their own demagnetizing field. Furthermore, when an input conductor associated with a particular thin film was energized in read or write operations, the magnetic field set up by its return conductor had a disturbing effect upon adjacent thin films. Also, the fabrication of prior art memory systems has been relatively slow and costly because of the tedious and time-consuming operation of making connections.

One object of the invention, therefore, is to provide magnetic memory apparatus in which the influence of stray magnetic fields is significantly reduced.

Another object of the invention is to provide magnetic memory apparatus in which the demagnetizing fields of the magnetic storage media are also reduced.

A further object of the invention is to provide magnetic memory apparatus in which the effect of disturbing magnetic fields is substantially cancelled.

Still a further object of the invention is to provide magnetic memory apparatus with increased signal output.

Another object of the invention is to provide magnetic memory apparatus in which less magnetic shielding is required.

Another object of the invention is to provide magnetic memory apparatus which requires fewer interconnections.

A further object of the invention is to provide magnetic memory apparatus which is low in cost and simple to fabricate.

Still another object of the invention is to provide magnetic memory apparatus characterized by its improved noise-cancelling ability.

Another object of the invention is to provide improvements in the techniques of fabricating magnetic and electrical components.

In accordance with the above objects, and considered first in one of its broader aspects, the invention comprises an assembly of first and second layers of elements of magnetic storage material arranged so that the elements of each layer form pairs of elements with the elements of the other layer, and a plurality of input conductors each inductively coupled to and extending between a plurality of pairs of magnetic elements. A pair of return conductors are connected to each input conductor and are so arranged that they are in mutual magnetic flux-cancelling relation. In another of its aspects, the invention provides improvements in interconnecting the several conductors of such nature that joints between conductors can be made rapidly in a simplified manner and at minimum cost.

The invention will be more clearly understood when the following detailed description of the preferred embodiment thereof is read in conjunction with the accompanying drawings in which FIG. 1 is a plan view, partly diagrammatic, of magnetic memory apparatus constructed in accordance with the invention, and which utilizes a plurality of assemblies, such as the assembly shown in FIG. 9, which are arranged in side-by-side stacks;

FIG. 2 is a schematic representation illustrating the connections of input row conductors of the assemblies of the adjacent stacks into single input conductors or digit lines, and illustrating also the connections of output conductors of the assemblies of the adjacent stacks into single output conductors or sense lines;

FIGS. 3 to 9 inclusive illustrate different stages in an illustrative method of fabricating the assembly shown in FIG. 9;

Figure 1:
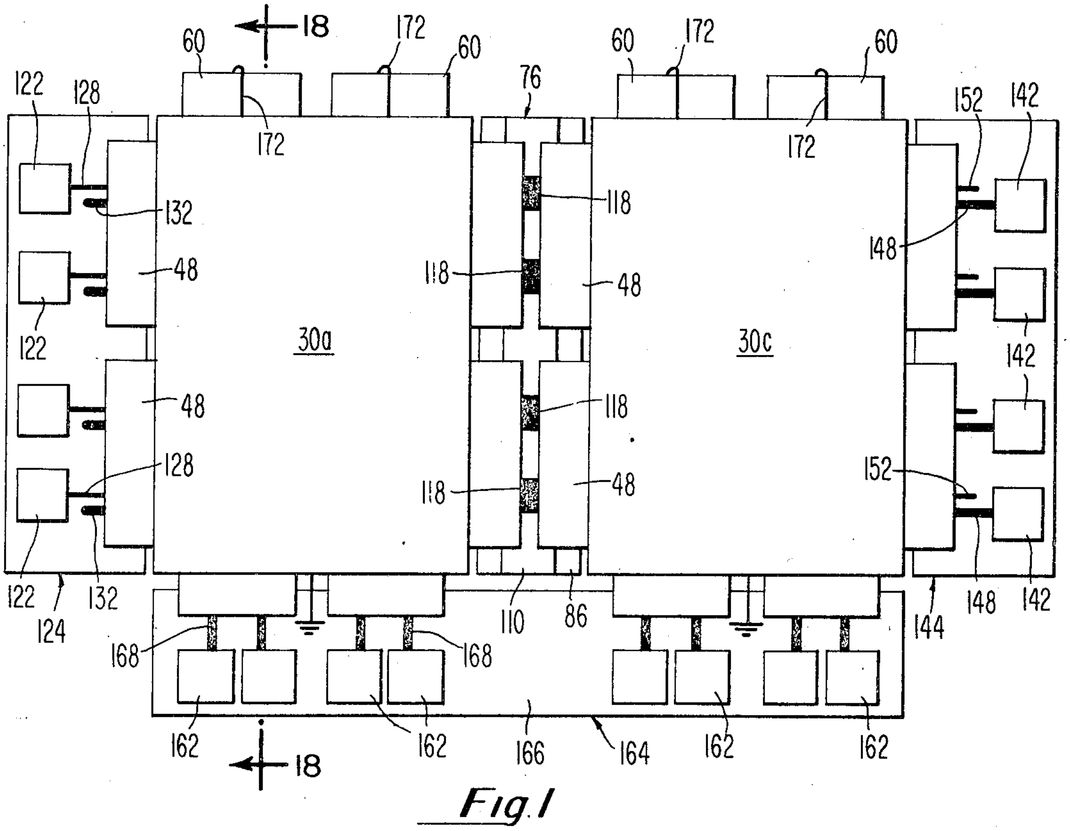
Figure 9:
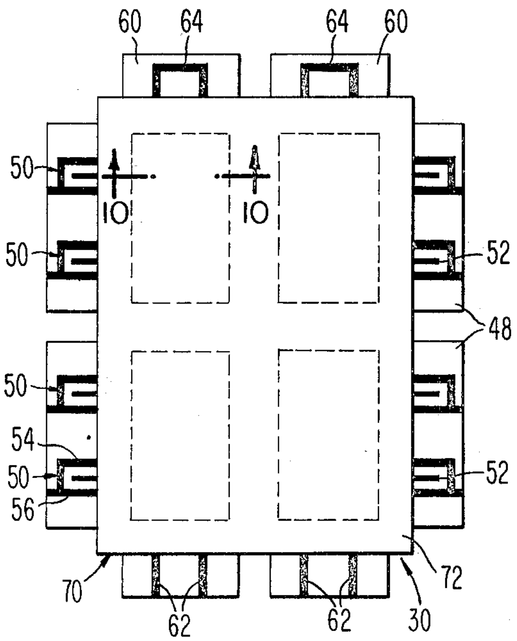
Figure 16:
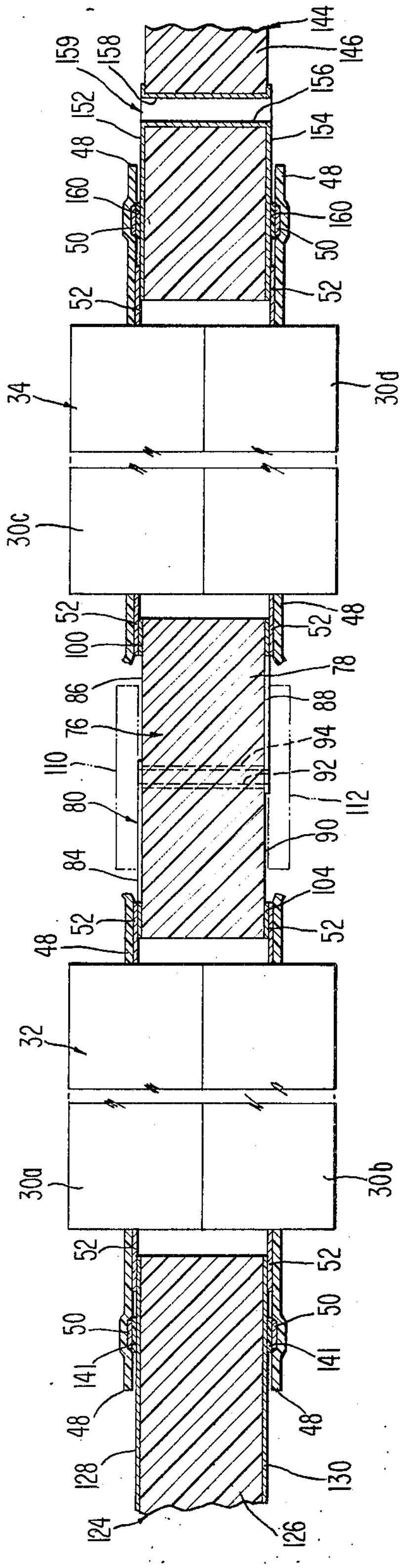
FIG. 16 is a sectional view, partly diagrammatic, taken along line 16—16 of FIG. 13 and illustrates more clearly the two-stack formation of the assemblies of the apparatus of FIG. 1 and the manner of connecting the sense line output conductors.
Figure 17:
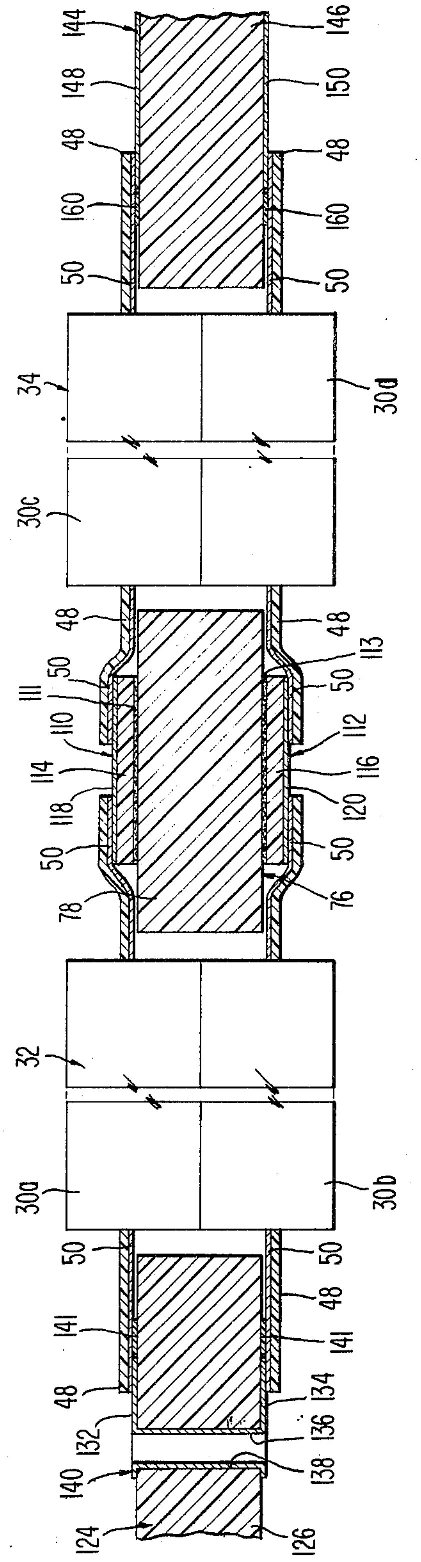
FIG. 17 is a sectional view, partly diagrammatic, taken along line 17—17 of FIG. 13 and illustrates the manner of connecting the digit line input row conductors.

Turning now to the details of the illustrated embodiment of the invention, a plurality of assemblies 30*a*, 30*b*, 30*c* and 30*d*, such as the individual assembly 30 shown in FIG. 9, are arranged in stack formation in the apparatus of FIG. 1, the stack formation being illustrated most clearly in FIGS. 16 and 17, in which 30*a* is the upper assembly and 30*b* the lower assembly of the left stack 32, and 30*c* and 30*d* the upper and lower assemblies, respectievly, of the right stack 34.

Each individual assembly 30 (FIG. 9) includes a backing board 36 (FIG. 3) which consists of a panel 38 of electrically insulating material such as glass epoxy, for example, and a conductive ground plane 40, such as a sheet of copper, for example, bonded to the panel 38.

Figures 3, 4, 5, 6, 7:
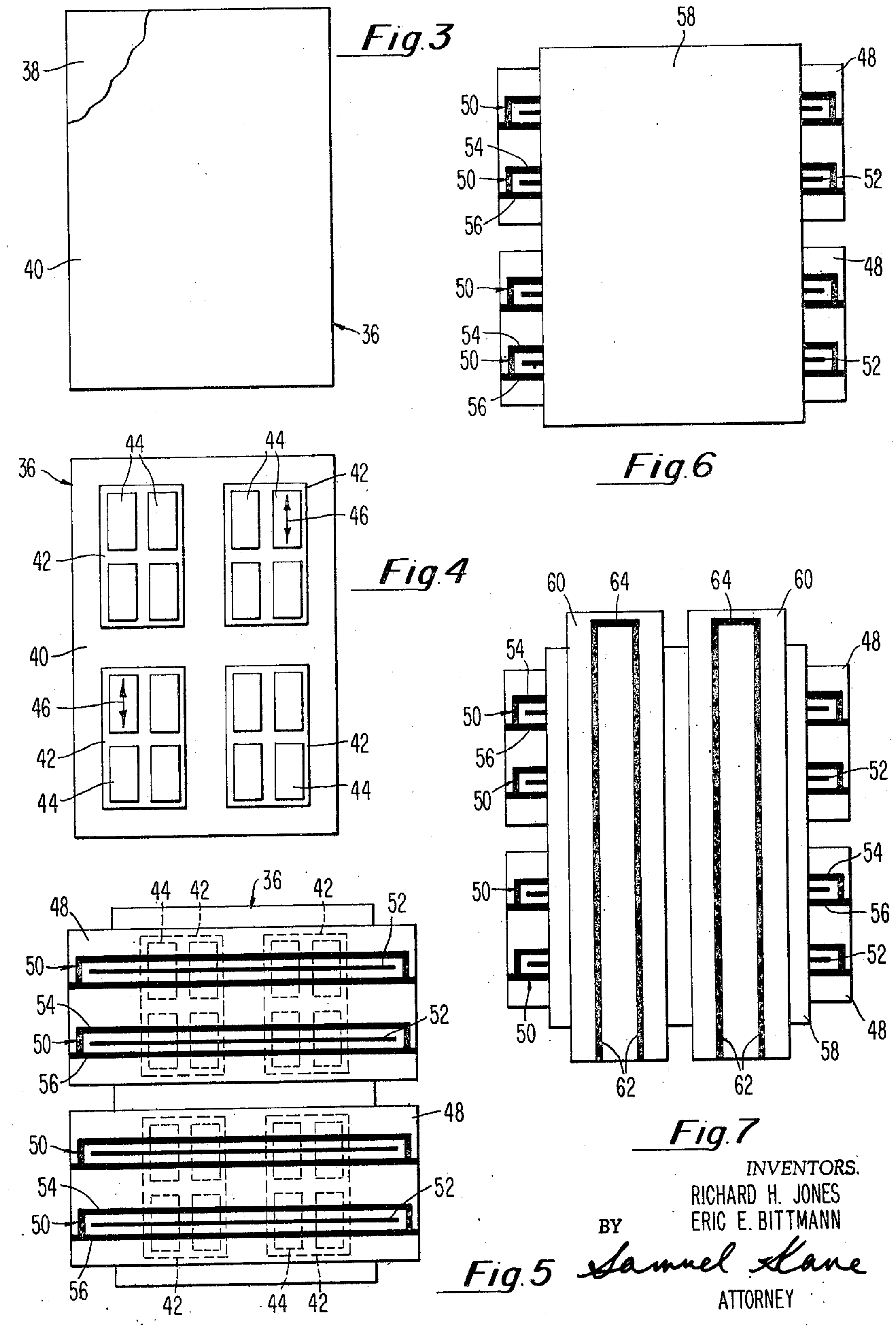

A plurality of substrates 42 (FIG. 4) of electrically insulating material, such as glass, for example, have bonded to one of their surfaces a plurality of magnetic bistable state storage media 44 which in one form are constituted as thin coatings or films which are preferably placed upon the individual substrates 42 by vacuum evaporation techniques. The thin films 44 are arranged on their respective substrates 42 with their easy or preferred axes or magnetization parallel and extending in take direction of the double-headed arrows 46 which represent the easy axes. The substrates 42 bearing the thin films 44 are placed against the ground plane 40 in a position, such as shown in FIG. 4, in which the thin films 44 are arranged in horizontal rows and in vertical columns, and collectively form the lower layer of thin films of the assembly 30.

A plurality of flexible tapes 48 (FIG. 5) of electrically insulating material have bonded to one of their surfaces a plurality of flat, flexible input row conductors or digit lines 50, and a plurality of flat, flexible output conductors or sense lines 52. In this connection, the reference in the specification or claims to the flat character of the various conductors discussed, and to be discussed, and the expression "flat conductors" are intended to include various types of thin, flat conductors which may be formed by any one or more of several known methods such as etching, vacuum evaporation, painting, plating of holes, etc. The tapes 48 may advantageously be made of a polyamide plastic material in order to give them excellent dimensional stability and heat resistance.

Each digit line 50 divides at its medial portion into two parallel conductors 54 and 56 and each sense line 52 between these parallel conductors 54 and 56 is arranged symmetrically between them in mutual capacity-reducing relation. The tapes 48 are positioned across the thin films 44 so that each digit line 50 and sense line 52 intersects and is inductively coupled to a row of thin films 44.

A sheet 58 of thermosetting adhesive material (FIG. 6) is next placed on top of the tapes 48 and this is followed by another plurality of flexible tapes 60 (FIG. 7) which may be constructed of a similar material as the tapes 48 and which have bonded to one of their surfaces a plurality of flat, flexible input column conductors or word lines 62. The word line conductors 62 on each tape 60 may be connected at one end by means of a flat, flexible bus 64. Each word line conductor 62 intersects and is inductively coupled to a vertical column of thin films 44.

Figure 10:
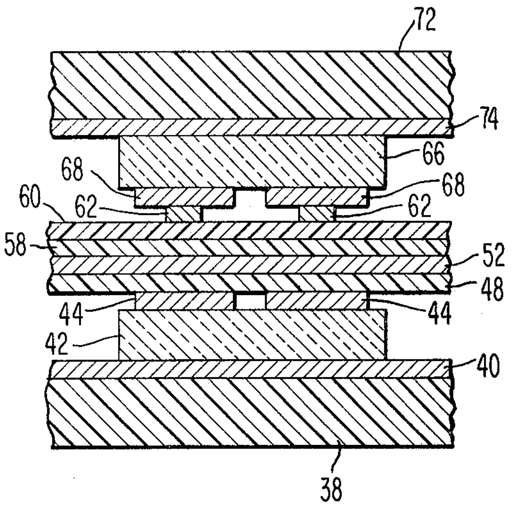
FIG. 10 is an enlarged fragmentary sectional view taken along line 10—10 of FIG. 9.

A second group of substrates 66 (FIG. 8) collectively bearing an upper layer of thin films 68 is next placed on top of the tapes 60 with the thin films 68 in contact with the word lines 62 and in flux-coupled relationship with the lower layer of thin films 44. The assembly is then completed by placing on top of the substrates 66 an upper backing board 70 (FIG. 9) constructed similarly as the board 36 of a glass epoxy panel 72 to which is bonded a conductive ground plane 74 (FIG. 10), such as a sheet of copper, for example. The completed assembly 30 of FIG. 9 is then subjected to heat and pressure until the sheet 58 of thermosetting adhesive bonds the several members of the assembly into a compact unit 30.

Figure 8:
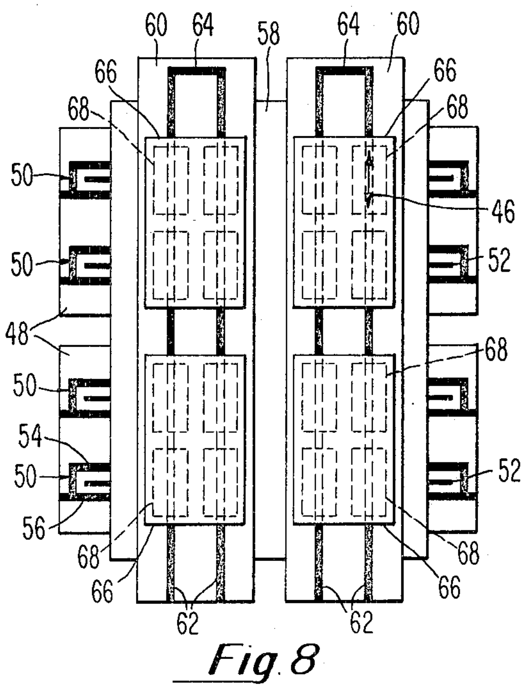

In the assembled unit 30 of FIG. 9, and as may be perceived most clearly from FIGS. 5 and 8, the lower and upper layers of thin films 44 and 68 are in superposed and coinciding relation so that each film 44 in the lower layer forms a pair with its superposed coinciding film 68 in the upper layer. This construction also arranges the layers of thin films 44 and 68 into pairs of horizontal rows of thin films and pairs of vertical columns of thin films, as viewed in FIG. 8.

As indicated earlier, the individual assemblies 30 are designated 30*a*, 30*b*, 30*c* and 30*d* in the assembled apparatus of FIG. 1 and arranged into the two stacks of assemblies 32 and 34 (FIGS. 16 and 17) and are interconnected with the circuitry of FIG. 1 by various circuits.

Figure 14:
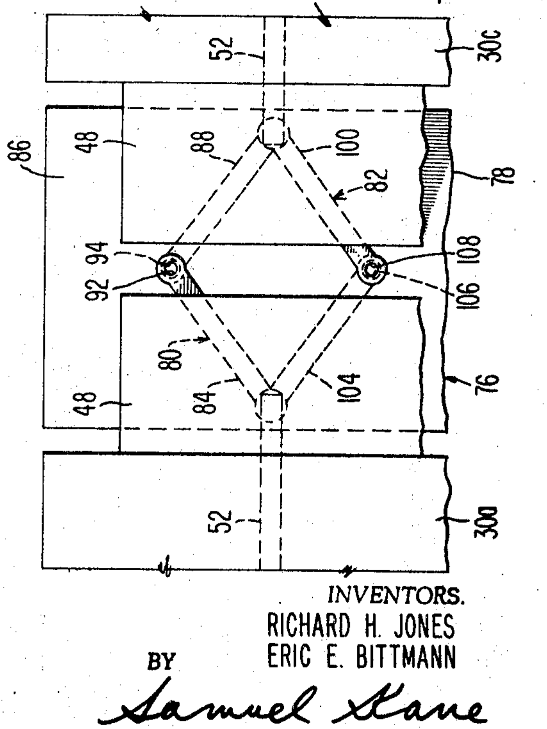
FIG. 14 is a view of a portion of the apparatus illustrated in FIG. 13 but with certain parts omitted to more clearly portray other parts.

Arranged between the two stacks of assemblies 32 and 34 (FIG 16) is a central crossover board 76 which comprises a panel 78 of electrically insulating material to which are bonded two groups of transposing conductors 80 and 82 (FIGS. 14 and 16). Each transposing conductor 80 has a flat portion 84 at the left margin on the upper surface 86 of the crossover board 76 and a flat portion 88 at the right margin on the lower surface 90 of the crossover board 76, and these two portions 84 and 88 are connected by means of a conductive coating or plating 92 on the surface of a transverse hole 94 extending through the crossover board 76.

The upper portion 84 of each transposing conductor 80 is connected to one end of one of the sense conductors 52 of the upper assembly 30*a* and the method of connecting these members, and other members to be described, is an important feature of the invention. As will be pointed out at different times hereinafter, the method of connection is typical and may be used for making the several connections in the apparatus of FIG. 1.

Figure 20:
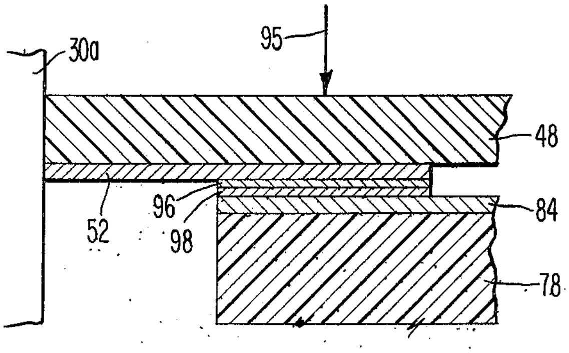
FIG. 20 is an enlarged view of a portion of the apparatus illustrated in FIG. 16 and shows a feature of the invention for mechanically and electrically joining thin flat conductors.

With reference to FIG. 20, the method of electrically and mechanically joining a flat sense conductor 52 and its associated flat transposing conductor portion 84 is to place one or preferably two thin layers of metal of substantially uniform thickness between the conductors and apply heat and pressure to the joint in the direction of the arrow 95, while ends of the conductors 52 and 84 are in an overlapped relation, until the heated metal unites the surfaces of the conductors 52 and 84. The metal is preferably a thin plating of metal of substantially uniform thickness on at least one of the conductors 52 or 84 and preferably, is obtained by plating individual thin coatings of solder 96 and 98, respectively on each of the conductors 52 and 84. By applying an appropriate amount of heat and pressure to a lap-joint so prepared and formed, as in FIG. 20, an excellent mechanical and electrical joint is made and which considerably simplifies the fabrication of electrical assemblies made up of panels which have flat conductors bonded to their surfaces.

Returning again to the discussion of each transposing conductor 80 (FIGS. 14 and 16), the lower portion 88 of each transposing conductor 80 on the bottom surface 90 of the crossover board 76 is solder-plated and placed into a lap-joint, as shown, in a manner similar to that just described in discussing FIG. 20, with its similarly solder-plated associated sense conductor 52 on the lower assembly 30*d* of the stack 34, and similarly connected to its associated sense conductor 52 by the application of heat and pressure to their lap-joint, as discussed previously. For purposes of simplicity, the solder platings, such as 96 and 98 shown in FIG. 20, have been omitted from the lap-joints of all the other figures.

The transposing conductors 82 are used for connecting the sense conductors 52 of the upper assembly 30*c* of the second stack 34 to their associated sense conductors 52 of the lower assembly 30*b* of the first stack 32. For such purpose, the transposing conductors 82 are constructed and arranged in a manner similar to that of the transposing conductors 80, and each transposing conductor 82 has a flat portion 100 (FIG. 14) at the right margin on the upper surface 86 of the crossover board 76 and a lower flat portion 104 at the left margin on the lower surface 90 of the crossover board, and with the two portions 100 and 104 connected by a conductive coating or plating 106 on the surface of a transverse hole 108 which extends through the crossover board 76.

Secured to the upper surface 86 of the central crossover board 76, and similarly secured to the lower surface 90 of the central crossover board 76, are, respectively, upper and lower boards 110 and 112 (FIG. 17) for making connections between the digit lines 50 of the upper assemblies 30*a* and 30*c* and between the digit lines 50 of the lower assemblies 30*b* and 30*d*. The boards 110 and 112 may be insulatingly secured to the crossover board 76 as by means of electrically insulating adhesive material 111 and 113 which insulate the boards 110 and 112 from the transposing conductors 80 and 82.

Figure 15:
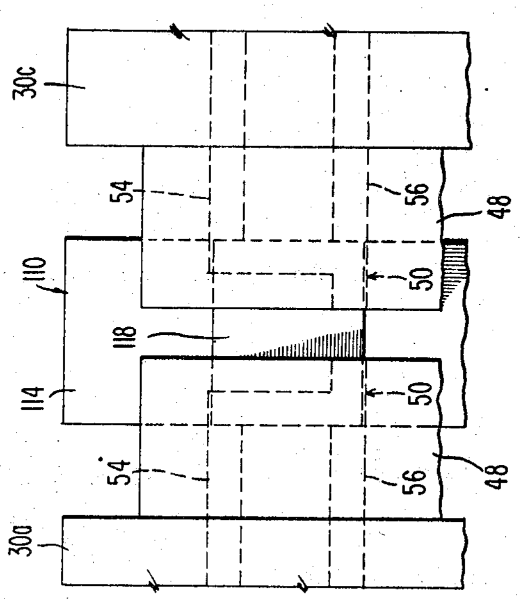
FIG. 15 is a view of a portion of the apparatus illustrated in FIG. 13 but also with certain parts omitted to more clearly portray other parts.

Each of the boards 110 and 112 comprises a panel 114 and 116, respectively, of electrically insulating material which has bonded to its outer surface a plurality of flat conductors 118 and 120, respectively. One end of each pair of associated digit lines 50 (FIG. 15) of the upper assemblies 30*a* and 30*c* and both ends of their associated conductor 118 are solder-plated similar to the flat conductors 52 and 84 in FIG. 20, and then similarly placed in overlapping relation, as shown, and then connected mechanically and electrically by the application of heat and pressure, as pointed out previously in discussing FIG. 20. The digit lines 50 of the lower assemblies 30*b* and 30*d* and the flat conductors 120 of the lower board 112 are similarly solder-plated and connected.

Figure 2:
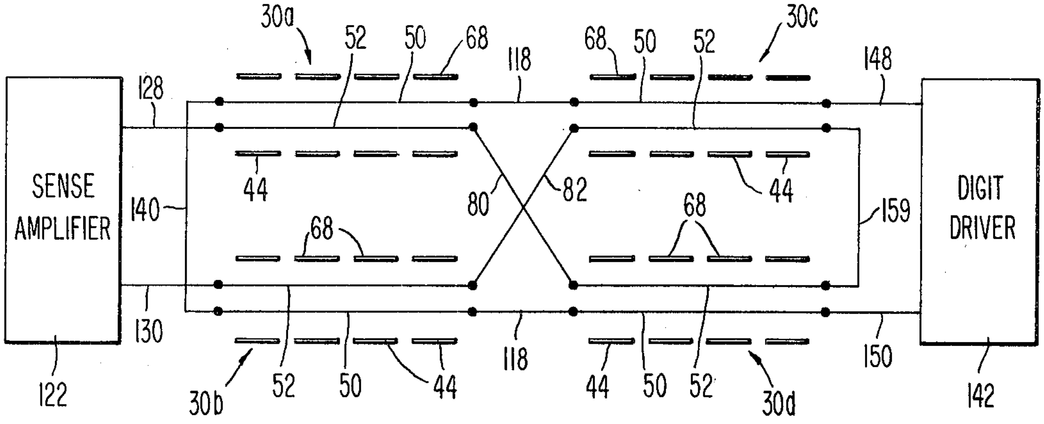
Figure 13:
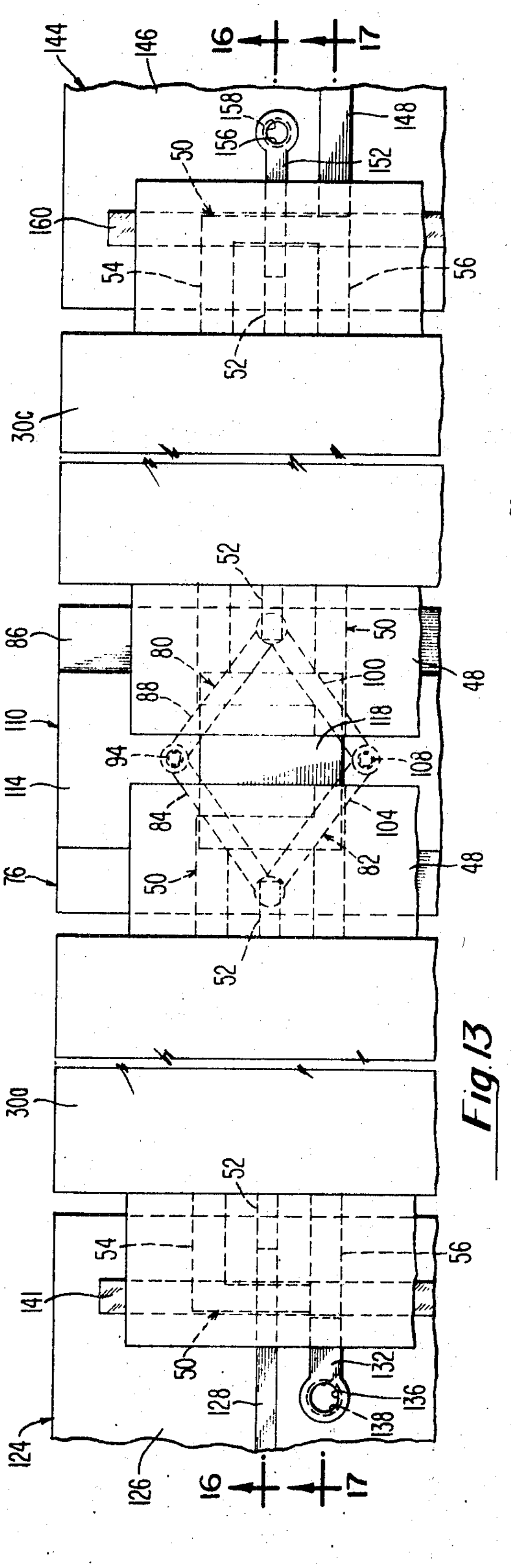
FIG. 13 is an enlarged fragmentary plan view of the apparatus of FIG. 1 and illustrates the manner in which certain conductors of the assemblies of the several stacks are interconnected, and the manner in which they are connected to associated amplifier and driver circuits.

The leftward ends of associated sense conductors 52 of the upper and lower assemblies 30*a* and 30*b*, as viewed in FIG. 16, are connected to an individual sense amplifier 122 (FIGS. 1 and 2) through the medium of a connecting board 124 on which the sense amplifiers 122 are mounted. The connecting board 124 comprises a panel 126 of electrically insulating material having bonded to its upper and lower surfaces flat conductors 128 and 130, respectively, which are connected to the input terminals of the associated sense amplifier 122. The leftward ends, as viewed in FIG. 16, of the sense conductors 52 of the stack 32 overlap the rightward ends of the flat conductors 128 and 130 and by means of solder plating, heat and pressure are connected to the conductors 128 and 130 in a manner similar to that described previously in discussing FIG. 20. Also, on the connecting board 124 there are bonded to its upper and lower surfaces alongside the conductors 128 and 130 a plurality of short, flat conductors 132 and 134, respectively (FIGS. 13 and 17). Each conductor 132 and its associated conductor 134 are interconnected by a conductive material 136 plated on the surface of a transverse hole 138 extending through the connecting board 124. Each conductor 132 and its associated conductor 134 and plating 136 constitute an end conductor 140 for connecting a digit line 50 of the upper assembly 30A to its associated digit line 50 of the lower assembly 30*b*.

The leftward end portions, as viewed in FIG. 17, of the digit lines 50 of the upper and lower assemblies 30*a* and 30*b* and the end portions of conductors 132 and 134 are solder-plated, similar to the conductors 52 and 84, as described previously, and then similarly placed in overlapping relation, as shown, and connection made by the application of heat and pressure, as pointed out in discussing FIG. 20. The flat conductors 128 and 130 are insulated from the digit lines 50 by means of strips 141 (FIGS. 13 and 16) of electrically insulating material each secured to one side of the connecting board 124, as by means of an electrically insulating adhesive, not shown.

The rightward ends of associated digit lines 50 of the upper and lower assemblies 30*c* and 30*d*, as viewed in FIG. 17, are connected to individual digit driver circuits 142 (FIGS. 1 and 2) by means of a connecting board 144 on which the digit driver circuits are mounted. The connecting board 144 comprises a panel 146 of electrically insulating material having bonded to its upper and lower surfaces flat conductors 148 and 150, respectively, which are connected to the output terminals of the associated digit drivers 142. The rightward end, as viewed in FIG. 17, of each digit lines 50 of the upper assembly 30*c* and its associated digit line 50 of the lower assembly 30*d* and the leftward ends of their associated conductors 148 and 150 are solder-plated, similar to the conductors 52 and 84, as discussed previously, placed in an overlapped position, as shown, and by means of heat and pressure are mechanically and electrically joined, as pointed out previously in discussing FIG. 20.

Connection is also made between each sense conductor 52 of the upper assembly 30*c* and its associated sense conductor 52 of the lower assembly 30*d* by means of flat conductors 152 and 154 (FIGS. 13 and 16) bonded to the upper and lower surfaces, respectively, of the connecting board 144 and a conductive material 156 plated on the surface of a transverse hole 158 which extends through the connecting board 144. Each conductor 152 and its associated conductor 154 and plating 156 constitute an end conductor 159 for connecting a sense conductor 52 of the upper assembly 30*c* to its associated sense conductor 52 of the lower assembly 30*d*.

The rightward end of the sense conductors 52 of the upper and lower assemblies 30*c* and 30*d*, as viewed in FIG. 16, and the leftward ends of the flat conductors 152 and 154 are solder-plated, similar to the conductors 52 and 84, as described previously, placed in overlapping relation, as shown, and connected by the application of heat and pressure, as pointed out previously in discussing FIG. 20. Strips 160 (FIGS. 13 and 17) of electrically insulating material are each secured to one side of the connecting board 144, as by means of an electrically insulating adhesive, not shown, and placed between the flat conductors 152 and 154 and the digit lines 50 to insulate these members from each other.

Figure 18:
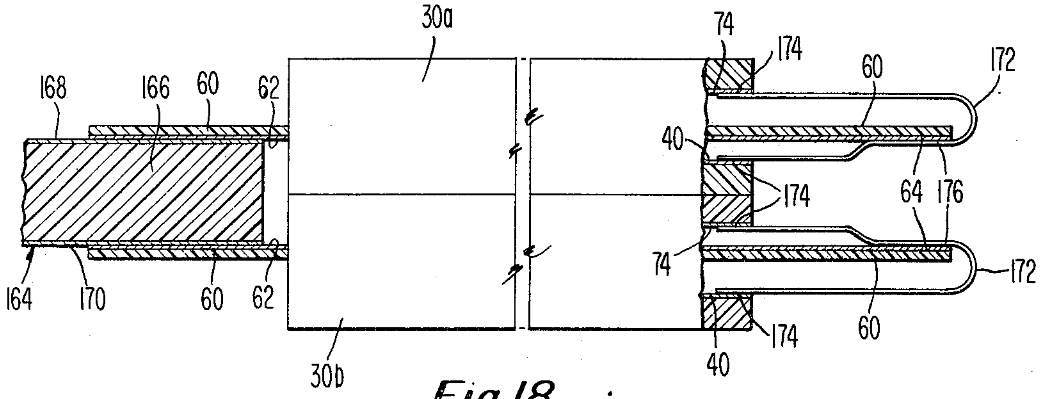
FIG. 18 is an enlarged fragmentary sectional view, partly diagrammatic, and with parts broken away, taken along line 18—18 of FIG. 1.
Figure 19:
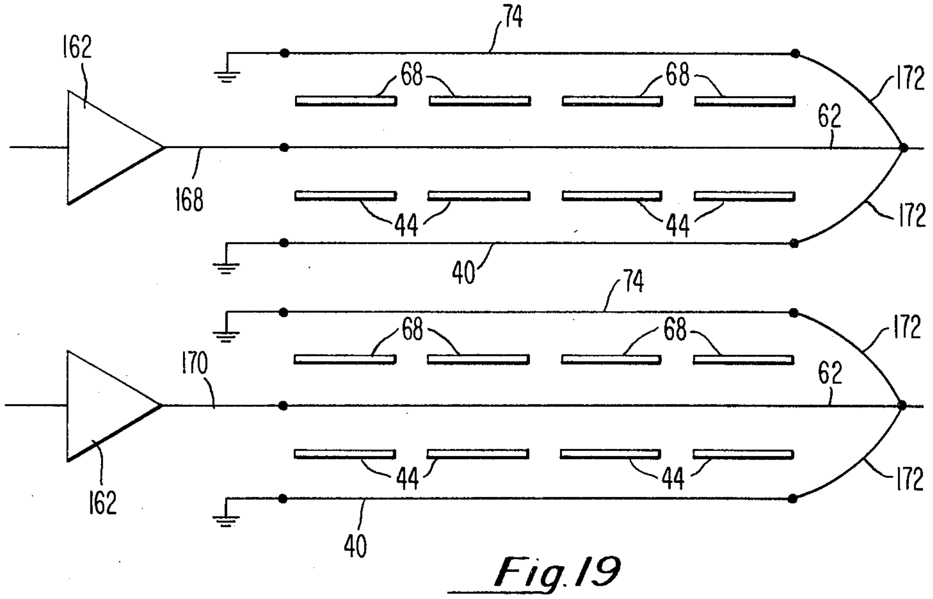
FIG. 19 is a schematic representation illustrating the connections of the word line input column conductors of the assemblies of each stack.

The input column conductors or word lines 62 (FIGS. 18 and 19) are connected to their respective word drivers 162 by means of a connecting board 164 (see also FIG. 1) which comprises a panel 166 of electrically insulating material having bonded to its upper and lower surfaces a plurality of flat conductors 168 and 170, respectively. Each of the flat conductors 168 and 170 is connected to one of the word lines 62 and to an output terminal of its associated word driver 162. The word lines 62 are in overlapping relation with the conductors 168 and 170 (FIG. 18) and together with these conductors are solder-plated, similar to the conductors 52 and 84, as described previously, and joined mechanically and electrically by the application of heat and pressure, as pointed out previously in discussing FIG. 20.

The buses 64 connecting the other ends of the word lines 62 on each tape 60 are each connected to both ground planes 40 and 74 of their associated assemblies (FIG. 18) by means of individual conductive strips 172 connected to the ground planes at 174 and to the buses 64 at 176.

It may now be perceived that a current flowing from a driver 162 through a word line 62 (FIG. 19) will divide equally and return to ground through the ground plane return conductors 40 and 74 which are grounded at the end nearest the input to the word line 62. Thus, the magnetic fields of currents flowing in the same direction in this pair of return conductors 40 and 74 will tend to cancel each other in the region intermediate the return conductors, and that region is in the vicinity of the upper and lower layers of thin films 68 and 44 of the associated assembly. Thus, whenever a word line 62 is energized in a write or read operation on an associated pair of thin films 44 and 68 between which the word line extends, the disturbing effect on adjacent pairs of thin films 44 and 68 will be negligible, since the magnetic fields of the word line return currents in 40 and 74 will substantially cancel each other in the region of the thin films.

Various known methods of writing information into a pair of thin films and of reading or interrogating a pair of thin films to sense its state of magnetization are known in the art. However, for purposes of illustration, a preferred method of writing a bit of information into a pair of thin films will be described, as will also a preferred method of reading the magnetic staus of a pair of thin films.

Figure 11:
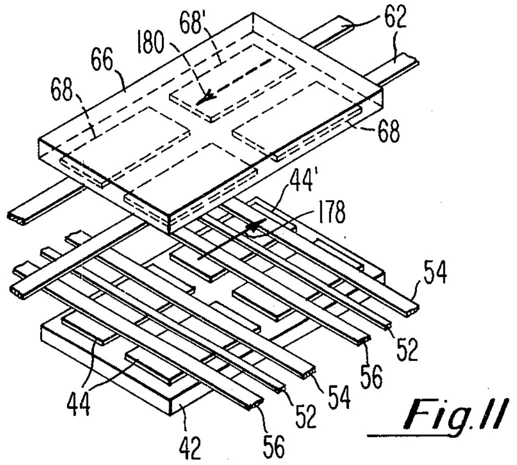
FIG. 11 is an enlarged fragmentary isometric exploded view of certain of the components of the assembly of FIG. 9.
Figure 12:
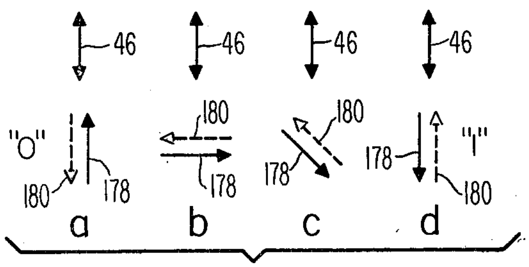
FIG. 12 is a vectorial representation of the magnetic induction vectors of a pair of magnetic storage media shown in FIG. 11, and illustrates the direction of these vectors at different times in a write operation.

It will be assumed that the pair of thin films, designated 44' and 68', shown in FIG. 11, are in the binary "0" state and that their magnetic induction vectors 178 and 180, respectively, also shown in FIG. 12*a*, are parallel to their easy axes 46 but have opposite directions.

A write operation is provided by energizing the word line 62 which extends between the selected pair of thin films 44' and 68' with a drive write current from its word driver 162 whose magnetic field is transverse to the easy axis 46 and which rotates the magnetic induction vectors 178 and 180 of the pair of films to the hard direction, as illustrated in FIG. 12*b*. The digit line 50, in the form of the parallel conductors 54 and 56, which extends between the selected pair of thin films 44' and 68' is also energized with a drive write current from its digit driver 142 which divides substantially equally into the conductors 54 and 56 and whose magnetic field is parallel to the easy axis 46 and serves to impart a further rotation of the magnetic induction vectors 178 and 180 to the position shown in FIG. 12*c*. Now, if the transverse field is removed first by removing the word line 62 current, the longitudinal field of the digit line 50 will serve to complete the switching of the magnetic induction vectors 178 and 180 to the position shown in FIG. 12*d*, in which position they will remain when the digit line 50 current is removed, thus completing a write operation and placing the pair of thin films 44' and 68' in the binary "1" state.

In order to provide a read or interrogation operation, only the word line 62 need be energized and this may be done with a current of either polarity so that the resulting magnetic field will cause the magnetic induction vectors 178 and 180 of the selected pair of thin films to move to the hard direction, similar to that shown in FIG. 12*b*. The resulting flux change in the pair of thin films resulting from the movement of their magnetic induction vectors to the hard direction will induce a signal in the sense conductor 52 which extends between the selected pair of thin films and this signal will be detected by the associated sense amplifier 122 to which the sense conductor 52 is connected.

It will now be apparent from the foregoing description that the invention provides improvements in magnetic storage devices whereby such devices may be operated more efficiently and fabricated at lower cost and with simpler and faster techniques.

While there has been shown and described a specific apparatus to exemplify the principles of the invention, it is to be understood that this is but one form of the invention and that the invention is capable of being constructed in a variety of shapes, sizes, and modifications without departing from the true spirit and scope thereof. Accordingly it is to be understood that the invention is not to be limited by the specific apparatus disclosed, but only by the subjoined claims.

What is claimed is:

1. Magnetic memory apparatus comprising a plurality of assemblies arranged in first and second spaced stacks, each stack having an upper assembly and a lower assembly, each assembly comprising first and second layers of thin films of multistable stage magnetic storage material, each thin film having an easy axis of magnetization, said layers being spaced and in superposed relation and with the thin films of each layer arranged in rows and in columns and forming pairs of rows of thin films and pairs of columns of thin films with the thin films of the associated layer, each pair of rows and each pair of columns containing pairs of thin films, the easy axes of each pair of thin films being parallel and each pair of thin films being sufficiently close to each other so as to establish flux coupling between them, a plurality of elongate input column conductors each inductively coupled to and extending between each pair of thin films of one of said pairs of columns of thin films, a plurality of elongate input row conductors each inductively coupled to and extending between each pair of thin films of one of said pairs of rows of thin films, each of said input conductors having end portions whereby individual drive write currents may be applied to a selected row conductor and a selected column conductor of such polarity and magnitude that together their magnetic fields will partially switch the pair of thin films common to the selected conductors from a reference state of magnetization toward a selected state of magnetization and upon removal of the drive write current from the selected column conductor the magnetic field of the drive write current of the selected row conductor will complete the switching of the selected pair of thin films to the selected state of magnetization, a pair of return conductors connected to one end of each column conductor, said return conductors being arranged in mutual magnetic flux-cancelling relation, and a plurality of elongate output conductors each inductively coupled to and extending between each pair of thin films of one of said pairs of rows of thin films for receiving a signal whenever an associated pair of thin films is interrogated, a plurality of first elongate transposing conductors each connecting one end of one of the output conductors of the upper assembly of the first stack to one end of one of the output conductors of the lower assembly of the second stack, and a plurality of second elongate transposing conductors each connecting one end of one of the output conductors of the upper assembly of the second stack to one end of one of the output conductors of the lower assembly of the first stack, and wherein the other end of each output conductor of each stack is adapted to be connected to the other end of an output conductor of the same stack so as to form a plurality of transposed output conductors each adapted to cancel noise induced therein by a current flowing through an associated input row conductor.

2. Memory apparatus comprising a plurality of assemblies arranged in first and second spaced stacks, each stack having an upper assembly and a lower assembly, each assembly comprising first and second layers of elements of bistable state magnetic storage material, said layers being spaced and in superposed relation and with the magnetic elements of each layer arranged in rows and in columns and forming pairs of rows of magnetic elements and pairs of columns of magnetic elements with the magnetic elements of the associated layer, each pair of rows and each pair of columns containing pairs of magnetic elements, a plurality of elongate input column conductors each inductively coupled to and extending between each pair of magnetic elements of one of said pairs of columns of magnetic elements, a plurality of elongate input row conductors each inductively coupled to and extending between each pair of magnetic elements of one of said pairs of rows of magnetic elements, a pair of return conductors connected to one end of each column conductor, said return conductors being arranged in mutual magnetic flux-cancelling relation, and a plurality of elongate output conductors each inductively coupled to and extending between each pair of magnetic elements of one of said pairs of rows of magnetic elements, a plurality of first elongate transposing conductors each connecting one end of one of the output conductors of the upper assembly of the first stack to one end of one of the output conductors of the lower assembly of the second stack, and a plurality of second elongated transposing conductors each connecting one end of one of the output conductors of the upper assembly of the second stack to one end of one of the output conductors of the lower assembly of the first stack, and wherein the other end of each output conductor of each stack is adapted to be connected to the other end of an output conductor of the same stack so as to form a plurality of transposed output conductors each adapted to cancel noise induced therein by a current flowing through an associated input row conductor.

3. Memory apparatus according to claim 2 wherein said elements of magnetic storage material are thin films.

4. Memory apparatus according to claim 3 wherein said input row conductors and said output conductors are flat and flexible and are placed on flexible tapes of electrically insulating material.

5. Memory apparatus according to claim 4 wherein the end portions of each transposing conductor are flat and are placed on opposite sides and on opposite margins of substantially rectangular first panel means of electrically insulating material and the medial portion thereof connecting said end portions is a coating of conductive material on a surface extending through said first panel means.

6. Memory apparatus according to claim 5 characterized further by the provision of second panel means of electrically insulating material bonded to one side of said first panel means and containing flat conductors thereon each connected to one end of an individual input row conductor of each upper assembly, and third panel means of electrically insulating material bonded to the other side of said first panel means and containing flat conductors thereon each connected to one end of an individual input row conductor of each lower assembly.

7. Memory apparatus according to claim 6 wherein said input column conductors are flat and flexible and are placed on flexible tapes of electrically insulating material, and wherein there is further provided fourth, fifth and sixth panel means of electrically insulating material, said fourth panel means containing a first group of flat conductors interconnecting the other ends of the input row conductors of the upper and lower assemblies of said first stack and a second group of flat conductors connecting the other end of the output conductors of the upper and lower assemblies of said first stack to associated amplifying means, said fifth panel means containing a third group of flat conductors interconnecting the other ends of the output conductors of the upper and lower assemblies of said second stack and a fourth group of flat conductors connecting the other end of the input row conductors of the upper and lower assemblies of said second stack to associated driving circuits, and said sixth panel means containing a fifth group of flat conductors connecting the other end of said input column conductors to associated driving circuits.

8. In combination with magnetic memory apparatus having an array of elements of bistable state thin film magnetic storage material and a first group of elongate flat conductors each inductively coupled to certain of said thin film elements, panel means of electrically insulating material, a second group of elongate flat conductors bonded to said panel means and each having a connecting surface overlapping and in substantially abutting relation with a connecting surface of one of the flat conductors of said first group, and at least one thin layer of a uniting metal of substantially uniform thickness between and uniting the overlapped connecting surfaces.

9. A combination according to claim 8 wherein said thin layer of uniting metal is a plating on at least one of said groups of flat conductors.

10. A memory device comprising an assembly of first and second layers of thin films of magnetic storage material, said layers being spaced and in superposed relation and with the thin films of each layer arranged in rows and in columns and forming pairs of rows of thin films and pairs of columns of thin films with the thin films of the other layer, each pair of rows and each pair of columns containing pairs of thin films, a plurality of elongate flexible spaced column strips of nonconductive material each supporting thereon a plurality of elongate flexible input column conductors each inductively coupled to and extending between each pair of thin films of one of said pairs of columns of thin films, a plurality of elongate flexible spaced row strips of nonconductive material each intersecting said column strips and each supporting thereon a plurality of elongate flexible input row conductors each normal to and intersecting each column conductor, each input row conductor inductively coupled to and extending between each pair of thin films of one of said pairs of rows of thin films, and a pair of return conductors adapted to be connected to each column conductor, said return conductors being arranged in mutual magnetic flux-cancelling relation.

11. A memory device comprising rectangular flat substrate means, an assembly of first and second layers of elements of bistable state magnetic storage material bonded to said substrate means, said layers being spaced and in superposed relation and with the elements of each layer coinciding with the elements of the other layer to form pairs of elements, a plurality of flexible input conductors each inductively coupled to and extending between each pair of elements of a plurality of pairs of elements and having flexible end portions extending beyond said substrate means for connection to associated apparatus, and a single pair of return conductors adapted to be connected to all input conductors, said return conductors being arranged in mutual magnetic flux-cancelling relation.

12. A memory device according to claim 11 wherein one of said return conductors is on one side of said assembly and the other return conductor is on the other side of the assembly.

13. A memory device according to claim 12 wherein each layer of elements is a rectangular array of elements and each return conductor is a broad sheet at least coextensive with the length and width of each array of elements.

14. A memory device according to claim 11 characterized further by the provision of means connecting said return conductors to said input conductors, and wherein a current flowing in one direction through one of said input conductors will flow in the generally opposite direction through said return conductors.

References Cited

UNITED STATES PATENTS

| | | | |
|---|---|---|---|
| 3,362,065 | 1/1968 | Lauriente et al. | |
| 3,257,649 | 6/1966 | Dietrich et al. | 340—174 |

JAMES W. MOFFITT, Primary Examiner